(12) United States Patent
Kesselman et al.

(10) Patent No.: US 8,824,422 B2
(45) Date of Patent: Sep. 2, 2014

(54) TECHNIQUES ENABLING DYNAMIC BANDWIDTH RESERVATION IN A WIRELESS PERSONAL AREA NETWORK

(75) Inventors: Alex Kesselman, San Jose, CA (US); Yuval Bachrach, Haifa (IL)

(73) Assignee: Intel Corporation, Santa Clara, CA (US)

( * ) Notice: Subject to any disclaimer, the term of this patent is extended or adjusted under 35 U.S.C. 154(b) by 997 days.

(21) Appl. No.: 12/229,385

(22) Filed: Aug. 21, 2008

(65) Prior Publication Data

US 2009/0232104 A1 Sep. 17, 2009

Related U.S. Application Data

(60) Provisional application No. 61/035,480, filed on Mar. 11, 2008.

(51) Int. Cl.
*H04J 3/00* (2006.01)

(52) U.S. Cl.
USPC .......................................................... 370/336

(58) Field of Classification Search
USPC ........................................ 370/336, 329, 338
See application file for complete search history.

(56) References Cited

U.S. PATENT DOCUMENTS

| 2005/0141451 | A1 | 6/2005 | Yoon et al. | |
|---|---|---|---|---|
| 2007/0248072 | A1 | 10/2007 | Kwon et al. | |
| 2007/0253391 | A1* | 11/2007 | Shao et al. | 370/338 |
| 2007/0286140 | A1 | 12/2007 | Kwon | |
| 2008/0095072 | A1* | 4/2008 | Shao et al. | 370/254 |
| 2008/0112370 | A1* | 5/2008 | Kwon | 370/336 |
| 2008/0175199 | A1* | 7/2008 | Shao et al. | 370/329 |
| 2009/0080366 | A1* | 3/2009 | Shao et al. | 370/315 |

FOREIGN PATENT DOCUMENTS

| JP | 2009-526550 A | 7/2009 |
|---|---|---|
| JP | 2009-539300 A | 11/2009 |
| JP | 2010-525651 A | 7/2010 |
| WO | 03/026221 A1 | 3/2003 |
| WO | 2007/142443 A1 | 12/2007 |
| WO | 2007/142444 A1 | 12/2007 |
| WO | 2009/114604 A2 | 9/2009 |
| WO | 2009-540658 A | 11/2009 |
| WO | 2009/114604 A3 | 12/2009 |

OTHER PUBLICATIONS

International Search Report and Written Opinion received for PCT Patent Application No. PCT/US2009/036779, mailed on Oct. 29, 2009, 11 pages.
Office Action Received for Chinese Patent Application No. 200910149711.4, mailed on Nov. 24, 2011, 4 pages of Office Action and 5 pages of English Translation.
Office Action Received for Chinese Patent Application No. 200910149711.4, mailed on Jun. 4, 2012, 4 pages of Office Action and 6 pages of English Translation.

(Continued)

*Primary Examiner* — Mohammad Anwar
(74) *Attorney, Agent, or Firm* — John F. Travis

(57) ABSTRACT

An embodiment of the present invention provides a method, comprising dynamically reserving free channel time blocks for directional transmissions in a wireless personal area network (WPAN) by a transceiver communicating with a Coordinator and the Coordinator allocating a part or a whole of unreserved channel time blocks for a directional link during a handshake with the transceiver.

14 Claims, 3 Drawing Sheets

(56) References Cited

OTHER PUBLICATIONS

Notice of Allowance Received for Korean Patent Application No. 2010-7020343, mailed on May 25, 2012, 2 pages of Notice of Allowance and 1 page of English Translation.
Office Action Received for Taiwan Patent Application No. 98107659, mailed on Jul. 25, 2012, 5 pages of Office Action and 1 page of English Translation only.
Office Action Received for European Patent Application No. 09720359.0, mailed on Oct. 22, 2010, 2 pages of Office Action.
Office Action Received for Korean Patent Application No. 2010-7020343, mailed on Oct. 24, 2011, 2 pages of English Translation only.
International Preliminary Report on Patentability Received for Patent Application No. PCT/US2009/036779, mailed on Sep. 23, 2010, 6 pages.
Office Action Received for Chinese Patent Application No. 200910149711.4. mailed on Oct. 15, 2012, 3 pages of Chinese Office Action and 4 pages of English Translation.
Office Action Received for Chinese Patent Application No. 200910149711.4. mailed on Feb. 5, 2013, 4 pages of Chinese Office Action and 9 pages of English Translation.
Office Action Received for Japanese Patent Application No. 2010-549942, mailed on Aug. 14, 2012, 5 pages of Japanese Office Action and 6 pages of English Translation.
Office Action Received for Japanese Patent Application No. 2010-549942, mailed on Apr. 1, 2014, 2 pages of Japanese Office Action and 2 pages of English Translation.
Supplemental European Search Report received for European Patent Application No. 09720359.0, mailed on Mar. 27, 2014, 7 pages of Supplemental Search Report.

* cited by examiner

TECHNIQUES ENABLING DYNAMIC BANDWIDTH RESERVATION IN A WIRELESS PERSONAL AREA NETWORK

CROSS REFERENCE TO RELATED APPLICATIONS

The present application claims priority to U.S. Provisional Patent Application Ser. No. 61/035,480, filed Mar. 11, 2008, by Li et al. entitled, "60 GHZ WPAN MAC AND PHY FEATURES".

BACKGROUND

The availability of 7 GHz of unlicensed spectrum in the 60 GHz band offers the potential for multi-Gigabit indoor wireless personal area networking (WPAN). Applications that require large bandwidth include uncompressed High Definition (HD) video streaming, fast file download from an airport kiosk (Sync & Go) and wireless display and docking, to name just a few. These applications cannot be supported over existing home networking solutions (IEEE 802.11 a/b/g/n and WiMedia UWB) because the required data rates far exceed the capabilities of these networks.

Thus, a strong need exists for improvements and new development in wireless personal area networks that operate in the 60 GHz band.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
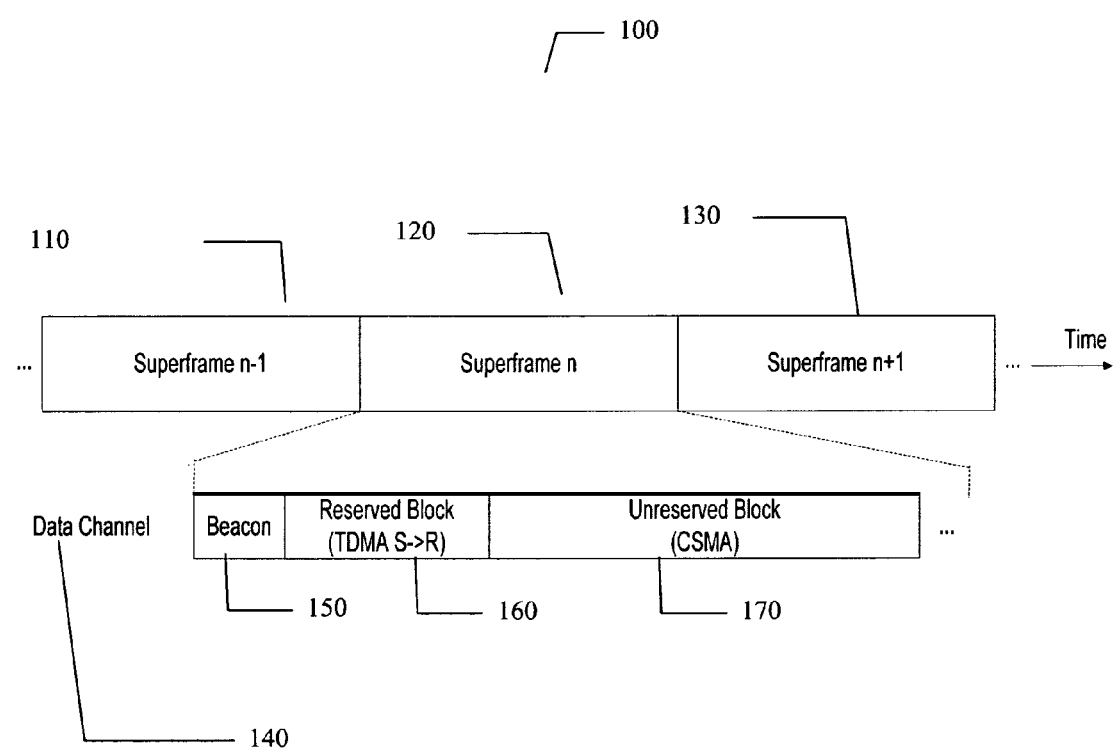
FIG. 1 provides an example of a super-frame schedule of an embodiment of the invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

In the following detailed description, numerous specific details are set forth in order to provide a thorough understanding of the invention. However, it will be understood by those of ordinary skill in the art that the invention may be practiced without these specific details. In other instances, well-known methods, procedures, components, units and/or circuits have not been described in detail so as not to obscure the invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

A millimeter (mm) wave communication link imposes more challenges in terms of link budget than those at lower frequencies (e.g. 2.4 GHz and 5 GHz bands) because of its inherent isolation due to both oxygen absorption, which attenuates the signal over long range, and its short wavelength, which provides high attenuation through obstructions such as walls and ceilings. In many cases, it is preferable to employ directional antennas for high-speed point-to-point data transmission. Devices performing directional transmissions can achieve higher range (mitigation for the link budget issue), as well as better aggregated throughput and spatial reuse, whereas certain pairs of devices separated in space can communicate simultaneously. A directional antenna pattern covering a wide range of angles to give omni-directional coverage may be employed to aid in neighbor discovery and beam-steering decisions. Furthermore, the antennae supported by devices can be of several types: Non-Trainable Antenna, Sectorized Antenna or Phased Array Antenna.

In a traditional 60 GHz WPAN, the channel time is scheduled using Time Division Multiple Access (TDMA) technology that does not support parallel transmissions. As seen in FIG. 1, generally shown as 100, channel time reservations are usually performed for each super-frame 110, 120 and 130 (the basic timing division for TDMA) by the Coordinator and communicated in the beacon frame 150. If a channel time block is reserved 160 for a specific pair of devices then the sender performs high-rate directional transmission. At the same time, if the channel time block is unreserved 170, it can be accessed using the CSMA (Carrier Sense Multiple Access) mechanism. Unfortunately, the CSMA mechanism necessitates using omni-directional transmissions that are rather inefficient and provide very low throughput. The existing medium access control (MAC) protocols allow reserving channel time blocks only starting from the next super-frame after the new schedule has been announced in the beacon 150. That incurs large delays for bursty data traffic, which adversely affects the application performance. On the other hand, reserving spare channel time for such traffic leads to poor channel utilization. An embodiment of the present invention provides a mechanism for dynamic reservation of free channel time blocks for directional transmission, which reduces the latency and increases the throughput of bursty data traffic.

Figure 2:
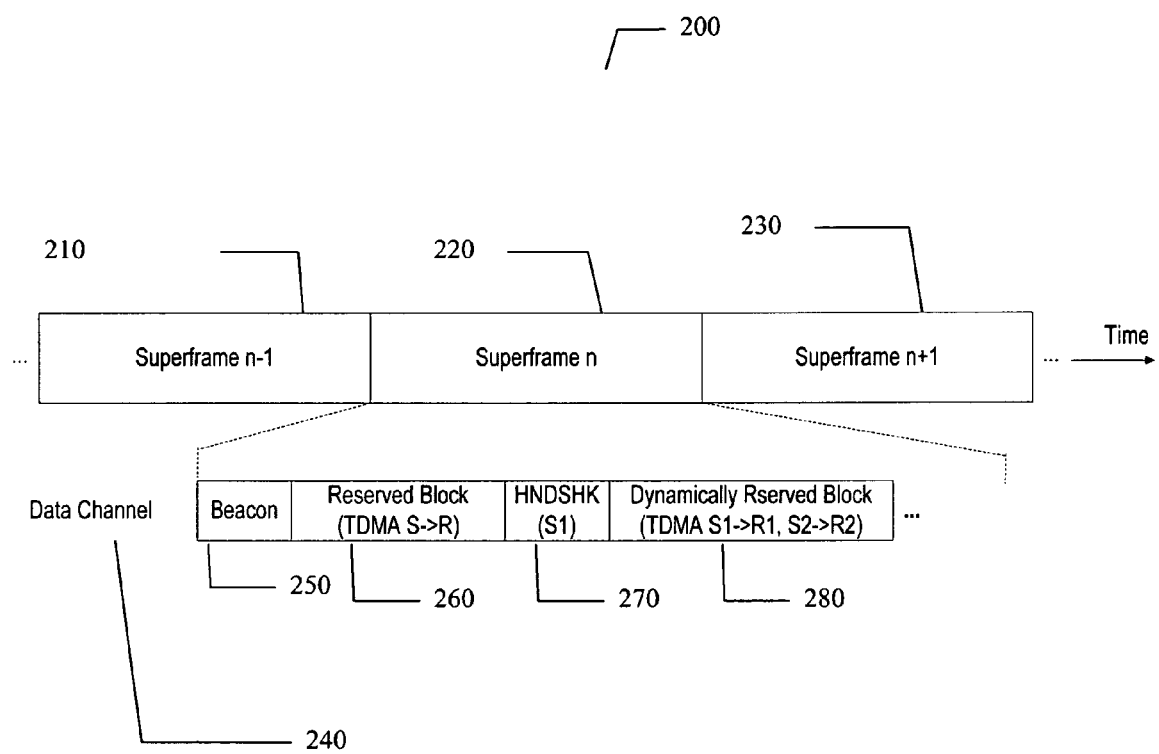
FIG. 2 provides a dynamic bandwidth reservation example an embodiment of the invention.

As shown in FIG. 2 at 200, an embodiment of the present invention provides a novel mechanism for dynamic reservation of free channel time blocks for directional transmission.

Superframes are shown at 210, 220 and 230 with superframe 220 called out at 240 and including beacon 250, reserved block 260, handshake 270 and dynamically reserved block 280. During handshaking 270 with the sender, the Coordinator allocates a part or the whole unreserved channel time block for a directional link. The bandwidth allocation request specifying the reservation period is sent by the sender using omni-directional or directional transmission pointed toward the Coordinator. The Coordinator responds to the sender using (quasi) omni-directional transmission that must be received by the other devices with the bandwidth grant message that specifies the allocated reservation period, which can be less than or equal to that in the bandwidth allocation request. In embodiment of the present invention, but not limited in this respect, the Coordinator may also allow certain non-interfering links to utilize the allocated channel time block as specified in the bandwidth grant message.

Figure 3:
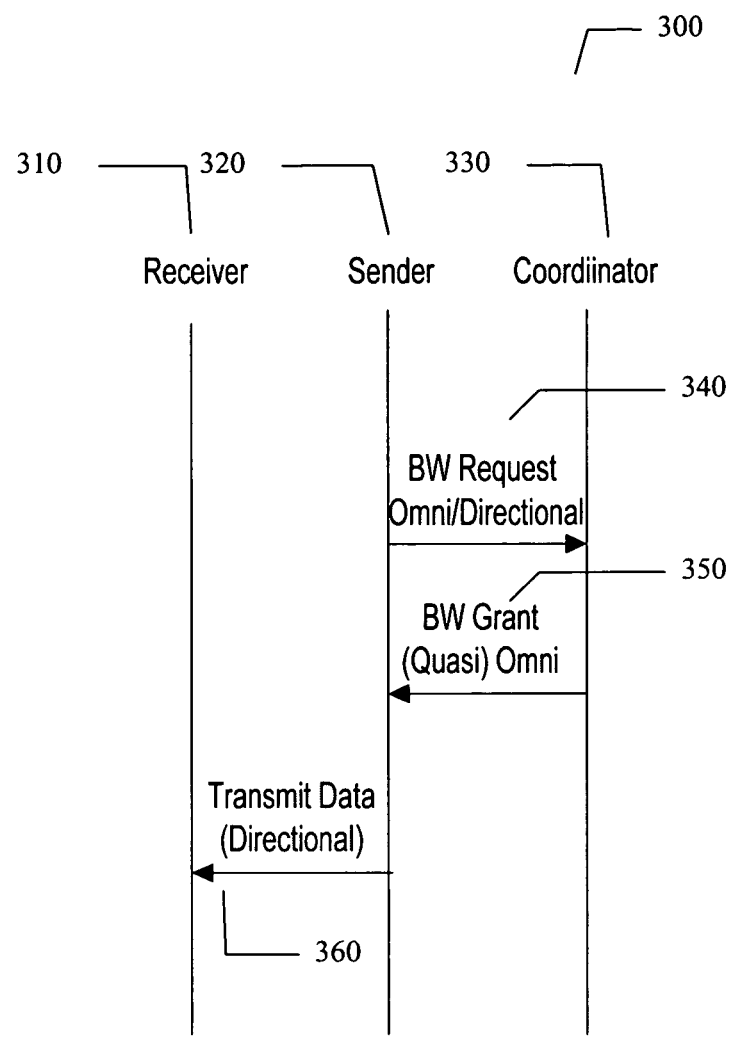
FIG. 3 illustrates a dynamic bandwidth reservation flow according to an embodiment of the present invention.

Looking now at FIG. 3 at 300, the message flow of the proposed mechanism is provided including receiver 310, sender 320 and coordinator 330. At 340 bandwidth request 340 is sent from sender 320 to coordinator 330 with a BW grant from coordinator to sender at 350. At 360 sender transmits (directional) data 360 to receiver 310. Further, in an embodiment of the present invention, the sender may itself act as the Coordinator and may need to just announce the grant.

As illustrated herein, embodiments of the present invention increase the throughput and decrease the latency for bursty data traffic. Further, the present invention maintains high channel utilization in presence of bursty data traffic and provides efficient channel sharing with constant and variable bit rate connections. It may also provide techniques for efficient spatial reuse and increases the capacity and the overall throughput of a WPAN.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. An apparatus, comprising:
    a transceiver operable in a wireless personal area network configured to communicate with a coordinator and at least one receiver, wherein said transceiver and said coordinator use a dynamic reservation of free channel time blocks for directional transmissions; and
    said Coordinator allocating a part or a whole of unreserved channel time blocks for a directional link during a handshake with said transceiver;
    wherein the handshake precedes the unreserved channel time blocks and a reserved time block precedes the handshake.

2. The apparatus of claim 1, wherein a bandwidth allocation request specifying a reservation period is sent by said transceiver using omni-directional or directional transmissions pointed toward said Coordinator.

3. The apparatus of claim 2, wherein said Coordinator responds to said transceiver using an omni-directional or quasi omni-directional transmission that must be received by the other devices with a bandwidth grant message that specifies the allocated reservation period.

4. The apparatus of claim 3, wherein said Coordinator is adapted to allow certain non-interfering links to utilize an allocated channel time block as specified in said bandwidth grant message.

5. The apparatus of claim 3, wherein said sender may itself act as said Coordinator and needs to just announce said grant.

6. A method, comprising:
    dynamically reserving free channel time blocks for directional transmissions in a wireless personal area network (WPAN) by a transceiver communicating with a Coordinator; and
    allocating by said Coordinator a part or a whole of unreserved channel time blocks for a directional link during a handshake with said transceiver;
    wherein the handshake precedes the unreserved channel time blocks and a reserved time block precedes the handshake.

7. The method of claim 6, further comprising sending by said transceiver a bandwidth allocation request specifying a reservation period using omni-directional or directional transmissions pointed toward said Coordinator.

8. The method of claim 7, further comprising configuring said Coordinator to allow certain non-interfering links to utilize an allocated channel time block as specified in said bandwidth grant message.

9. The method of claim 6, further comprising responding by said Coordinator to said transceiver using an omni-directional or quasi omni-directional transmission that must be received by the other devices with a bandwidth grant message that specifies the allocated reservation period.

10. The method of claim 9, further comprising said sender acting itself as said Coordinator and just announcing said grant.

11. A non-transitory machine-accessible medium that provides instructions, which when accessed, cause a machine to perform operations comprising:
    dynamically reserving free channel time blocks for directional transmissions in a wireless personal area network (WPAN) by a transceiver communicating with a Coordinator; and
    allocating a part or a whole of unreserved channel time blocks for a directional link during a handshake with said transceiver;
    wherein the handshake precedes the unreserved channel time blocks and a reserved time block precedes the handshake.

12. The non-transitory machine-accessible medium of claim 11, further comprising said instructions causing said machine to perform operations further comprising sending by said transceiver a bandwidth allocation request specifying a reservation period using omni-directional or directional transmissions pointed toward said Coordinator.

13. The non-transitory machine-accessible, medium of claim 12, further comprising said instructions causing said machine to perform operations further comprising responding by said Coordinator to said transceiver using an omni-directional or quasi omni-directional transmission that must be received by the other devices with a bandwidth grant message that specifies the allocated reservation period, which can be less than or equal to that in the bandwidth allocation request.

14. The non-transitory machine-accessible medium of claim 13, further comprising said instructions causing said machine to perform operations further comprising configuring said Coordinator to allow certain non-interfering links to utilize an allocated channel time block as specified in said bandwidth grant message.

\* \* \* \* \*